US012414884B1

(12) United States Patent
Schneider et al.

(10) Patent No.: US 12,414,884 B1
(45) Date of Patent: Sep. 16, 2025

(54) TILTABLE WHEELCHAIR

(71) Applicant: Ki Mobility LLC, Stevens Point, WI (US)

(72) Inventors: Richard E. Schneider, Russell Springs, KY (US); Alan Ludovici, Stevens Point, WI (US); Thomas J. Whelan, Stevens Point, WI (US); Murray G. Slagerman, MB (CA)

(73) Assignee: Ki Mobility, LLC, Stevens Point, WI (US)

( * ) Notice: Subject to any disclaimer, the term of this patent is extended or adjusted under 35 U.S.C. 154(b) by 701 days.

(21) Appl. No.: 17/833,646

(22) Filed: Jun. 6, 2022

Related U.S. Application Data

(60) Provisional application No. 63/197,276, filed on Jun. 4, 2021.

(51) Int. Cl.
*A61G 5/00* (2006.01)
*A61G 5/08* (2006.01)
*A61G 5/10* (2006.01)
*A61G 5/12* (2006.01)

(52) U.S. Cl.
CPC ......... *A61G 5/1075* (2013.01); *A61G 5/0883* (2016.11); *A61G 5/12* (2013.01); *A61G 2203/74* (2013.01)

(58) Field of Classification Search
CPC ...... A61G 5/1075; A61G 5/0883; A61G 5/12; A61G 2203/74; A61G 5/00
USPC .......................................................... 280/43.1
See application file for complete search history.

(56) References Cited

U.S. PATENT DOCUMENTS

| | | | | | |
|---|---|---|---|---|---|
| 4,655,471 | A * | 4/1987 | Peek | A61G 5/1054 | 297/358 |
| 5,354,120 | A * | 10/1994 | Volkle | A47C 1/03233 | 297/300.1 |
| 6,641,214 | B2 * | 11/2003 | Veneruso | B60N 2/02246 | 297/343 |
| 7,144,026 | B2 * | 12/2006 | Kao | A61G 5/1067 | 280/647 |
| 7,871,094 | B2 * | 1/2011 | Balcom | A61G 5/1054 | 280/250.1 |
| 8,132,823 | B2 * | 3/2012 | Balcom | A61G 5/1075 | 280/250.1 |

(Continued)

*Primary Examiner* — James A Shriver, II
*Assistant Examiner* — Hilary L Johns
(74) *Attorney, Agent, or Firm* — Thedford I. Hitaffer; Hitaffer, PLLC

(57) ABSTRACT

A tiltable wheelchair comprises a tilt seat guide assembly supported in relation to a base frame and a first roller supported in relation to the tilt seat guide assembly for supporting a seat frame for movement in relation to the base frame. The first roller is movable along the tilt seat guide assembly in fore and aft directions to enable tilt of the seat frame in relation to the base frame. A link arm may be connected between the base frame and seat frame to urge the seat frame upward and rearward to tilt the seat frame as the first roller moves in a forward direction. A second roller may be provided to cooperate with a guide rail, which is supported in relation to the tilt seat guide assembly, so as to track the movement of the first roller and prevent lateral translation of the seat frame in relation to the base frame. A locking device may be provided for holding the seat frame in a desired position.

10 Claims, 10 Drawing Sheets

(56) References Cited

U.S. PATENT DOCUMENTS

| | | | | |
|---|---|---|---|---|
| 8,235,407 | B2 * | 8/2012 | Cerreto | A61G 5/1067 280/250.1 |
| 8,419,130 | B2 * | 4/2013 | Bergman | B60N 2/10 297/316 |
| 8,511,699 | B2 * | 8/2013 | Balcom | A61G 5/1054 280/250.1 |
| 9,554,955 | B2 * | 1/2017 | Blauch | A61G 5/1075 |
| 9,907,713 | B2 * | 3/2018 | Dahlin | A61G 5/104 |
| 9,994,321 | B2 * | 6/2018 | Murnan | B64D 11/06 |
| 10,232,744 | B2 * | 3/2019 | Meister | B64D 11/0642 |
| 10,427,793 | B2 * | 10/2019 | Oleson | B64D 11/0696 |
| 10,450,071 | B2 * | 10/2019 | Jones | B64D 11/06395 |
| 10,828,213 | B1 * | 11/2020 | Ludovici | A61G 5/1054 |
| 2009/0045599 | A1 * | 2/2009 | Balcom | A61G 5/1054 280/250.1 |
| 2012/0080245 | A1 * | 4/2012 | Bergman | A61G 5/125 297/325 |
| 2012/0104724 | A1 * | 5/2012 | Balcom | A61G 5/1075 29/401.1 |
| 2015/0231004 | A1 * | 8/2015 | Dahlin | A61G 5/1075 280/304.1 |
| 2015/0305953 | A1 * | 10/2015 | Blauch | A61G 5/107 280/250.1 |
| 2018/0185215 | A1 * | 7/2018 | Brown | A61G 5/1067 |
| 2019/0060144 | A1 * | 2/2019 | St-Cyr | A61G 5/10 |

* cited by examiner

TILTABLE WHEELCHAIR

CROSS-REFERENCE TO RELATED APPLICATIONS

This application claims priority to U.S. Provisional Patent Application No. 63/197,276, filed on Jun. 4, 2021, the disclosure of which is incorporated herein by reference.

BACKGROUND

The present invention relates to wheelchairs and more particularly, tiltable wheelchairs.

Patients or occupants who sit in wheelchairs for prolonged periods of time are prone to the risk of pressure injuries, particularly at points where boney prominence impinge on area of contact (e.g., slings, panels, cushions). To mitigate this risk, attendants frequently change the position of the occupants. This is often done by tilting the occupant in the wheelchair. For this purpose, reclinable or tiltable wheelchairs are provided. A reclining wheelchair comprises a backrest that moves between an upright position and various angled position. Reclining the backrest does not affect the position of the seat, though it may give some relief to the occupant in terms of continuous pressure that may result in injury. In a tiltable wheelchair, the seat and backrest together are movable to various angled positions. A problem associated with such wheelchairs, particularly pediatric wheelchairs, which a relative compact, is that the wheelchairs are not foldable. This makes it difficult to transport and store the wheelchairs. Another problem is that the tiltable feature adds weight to the wheelchair, which may affect the ease with which the wheelchair may be propelled or displaced, as well as ease of transport. Additionally, a tiltable feature (e.g., components that limit horizontal translation) may add to the footprint of the wheelchair, affecting its ability to be compact. Further, the tiltable feature may also be difficult to operate, particularly in a manually tiltable wheelchair, depending on the weight of the occupant and the configuration of the tiltable feature and/or wheelchair. What is needed is a lightweight, compact tiltable wheelchair that addresses the aforementioned problems.

SUMMARY OF THE INVENTION

The present invention a tiltable wheelchair comprising a tilt seat guide assembly supported in relation to a base frame and a first roller supported in relation to the tilt seat guide assembly for supporting a seat frame for movement in relation to the base frame. The first roller is movable along the tilt seat guide assembly in fore and aft directions to enable tilt of the seat frame in relation to the base frame. The tiltable wheelchair may be comprised of a link arm connected between the base frame and seat frame to urge the seat frame upward and rearward to tilt the seat frame as the first roller moves in a forward direction. A second roller may be provided to cooperate with a guide rail so as to track the movement of the first roller and prevent lateral translation of the seat frame in relation to the base frame. A locking device may be provided for holding the seat frame in a desired position.

Various advantages of this invention will become apparent to those skilled in the art from the following detailed description of the preferred embodiment, when read in light of the accompanying drawings.

BRIEF DESCRIPTION OF THE DRAWINGS

Various features and attendant advantages of the shower tray will become more fully appreciated when considered in view of the accompanying drawings, in which like reference characters designate the same or similar parts and/or features throughout the several views, drawn to scale, and wherein.

DETAILED DESCRIPTION OF THE PREFERRED EMBODIMENT

In light of the aforementioned Figs., and in accordance with the adopted numbering, one may observe therein an example of a preferred embodiment of the invention, which comprises the parts and elements indicated and described in detail below.

Figure 1:
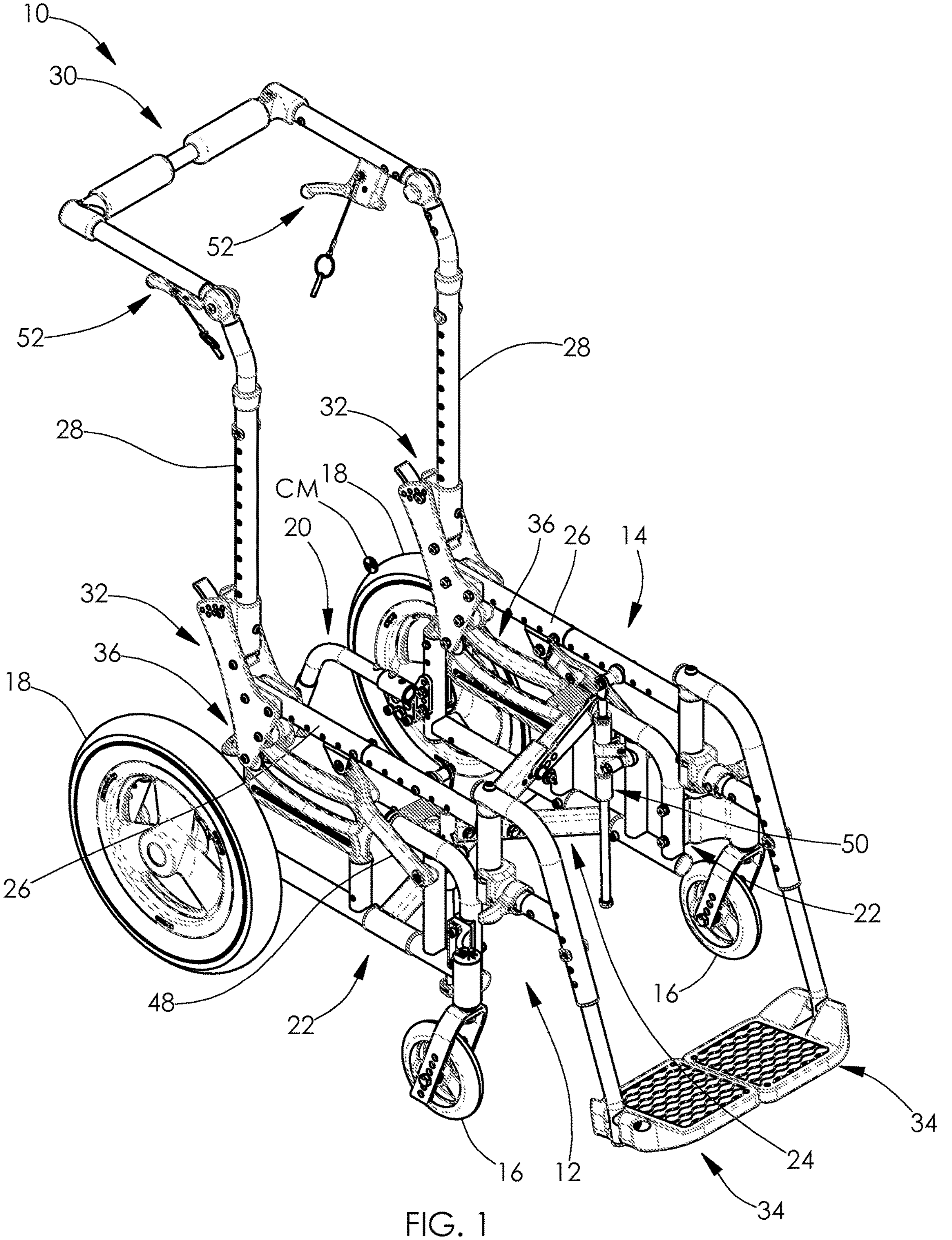
FIG. 1 is a front perspective view of a tilt wheelchair in a non-tilted position.

With reference to FIG. 1, there is illustrated a wheelchair 10 comprising a base frame 12 and a seat frame 14 supported in relations to the base frame 12. Wheels 16, 18 are provided for supporting the base frame 12 in relation to a support surface (e.g., the ground, a floor, etc.). Front caster wheels 16 may be provided for supporting a forward portion of the base frame 12. The front caster wheels 16 are configured to swivel, to promote maneuverability of the wheelchair 10. Rear wheels 18 support a rear portion of the base frame 12. The rear wheels 18 shown are relatively small non-driven wheels. However, it should be understood that larger drive wheel may be provided for manually propelling the wheelchair 10. The front caster wheels 16 may be supported by a caster fork, which an upwardly extending spindle that cooperates with bearings housed in a caster housing, which may be adjustably supported at various angular orientations in relation to the forward portion of the base frame 12, for example, to accommodate various angular orientation of the base frame 12. The rear wheels 18 may be comprised of a hub, radially extending spokes and rim for supporting a tire. The rear wheels 18 may be supported by an axle (e.g., supported in relation to the hub), which may be releasably engageable with an axle tube, which in turn may be supported at various heights and angular orientations in relation to the rear portion of the base frame, for example, to adjust the angular orientation of the base frame and camber of the rear wheels 18. Anti-tip wheel assemblies 20 may be supported in relation to the rear portion of the base frame 12 to mitigate or prevent the wheelchair 10 from over-tipping in a rearward direction. The illustrated anti-tip wheel assemblies 20 comprise an angular tube, which may be comprised of a longitudinally extending member that may be releasable insertable in a socket disposed at the rear portion of the base frame 12. The angular tube may be adjustable longitudinally (e.g., in fore and aft directions), as well as in height in relation to the rear portion of the base frame 12. The angular tube may further comprise a downwardly extending member, which may support at various elevations an anti-tip wheel.

The base frame 12 may be in the form of a tubular frame, comprised of side frames 22, which may be comprised of a plurality of tubular members fixedly and adjustably attached in relation to one another. The base frame may comprise upper and lower tubular members, which may be supported in vertically spaced relation to one another by upright or vertically oriented tubular members. The various tubular members may telescopically interface so as to be adjustable in relation to each other, and/or may be fixedly attached, so as by welding. In the illustrated embodiment, vertically oriented tubular members include front and rear tubular members, as well as intermediate tubular members.

The side frames 22 are held in laterally spaced relation by a cross-frame assembly 24, which may be in the form of X-frame and a scissor arrangement, comprised of forward and rearward tubular members having upper and lower end pivotably attached to opposing upper and lower tubular members of the side frames 22, to enable the cross-frame assembly 24 to be laterally folded, thus provide a foldable wheelchair.

The seat frame 14 may be in the form of a tubular frame, comprised of seat tubes 26 and seat back tubes 28, which may be comprised of a plurality of tubular members fixedly and adjustably attached in relation to one another. In the illustrated embodiment, the seat tubes 26 telescopically interface to permit longitudinal adjustment in the seat tubes 26, to provide seat depth adjustment. The seat back tubes 28 may support a push handle assembly 30, which may be grasped by an attendant, such as healthcare worker, to push the wheelchair 10. The push handle assembly 30 may be telescopically or otherwise adjustable in relation to the seat back tubes 28 to permit height adjustment in the seat back tubes 28. The push handle assembly 30 may also be angularly adjustable in relation to the seat back tubes 28 to permit the push handle assembly 30 to be angularly adjustable and/or foldable in relation to the seat back tubes 28.

It should be appreciated that the upper tubular members of the seat tubes 26 may support a laterally extending seat, such as a seat sling (e.g., a canvas or upholstered seat) or a foldable seat panel (e.g., a foldable ridge panel), and the seat back tubes 28 may support a laterally extending seat back, such as a canvas or upholstered seat back. The seat and seat back may be supported in relation to corresponding tubes in any suitable manner, including the use of support bars and fasteners for fastening the seat and seat back at various points in relation to the corresponding tubes.

The seat tubes 26 and seat back tubes 28 may be supported in relation to one another by seat bracket assemblies 32, which may be comprised of laterally spaced brackets, which may support the seat tubes 26 and seat back tubes 28 and fixed and/or pivotal relation to one another. In the illustrated embodiment, the seat tubes 26 are supported in fixed relation to the bracket assemblies 32 (in a longitudinal and forward extending direction (i.e., left to right direction) when viewing FIG. 2). The seat back tubes 28 are supported in pivotal relation to the bracket assemblies 32 (in an upright direction when viewing FIG. 2), so as to enable the seat back tubes 28 to be angularly adjustable and/or fold in relation to the bracket assemblies 32. The bracket assemblies 32 have a lower portion that is supported in relation to the rear portion of the base frame 12, as will become apparent in the description that follows.

Footrest assemblies 34 may be supported in relation to a forward portion of the seat tubes 26. The footrest assemblies 34 may be comprised of an insertion member (e.g., a plug), which is configured to be inserted into an upper open end of an upright or downwardly extending tube, which is supported in fixed relation to the forward portion of the seat tubes 26. A lower of the downwardly extending tube may support a first component of a latch assembly. A footrest tube assembly may be comprised of a footrest tube that extends forwardly and downwardly from the insertion member and an offset tube extending rearwardly in fixed relation to the footrest tube. A rear portion of the offset tube support a second component of the latch assembly, which cooperates with the first component, which enabled the footrest assemblies 34 to be pivoted and latched in various portions in relation to the seat tubes 26 (e.g., forwardly, outwardly to the left side, and/or inwardly toward the center of the seat frame 14). The footrest tubes may comprise telescoping members, which permit the length of the footrest tubes to be adjusted, and support at a lower end thereof footrests or foot plates, for supporting the feet of a wheelchair occupant.

An upper rear portion of each side frame 22 comprises a tilt seat guide assembly 36, which may be generally arcuate in shape. The tilt seat guide assembly 36 comprises an upper guide member 38 and a lower guide member 40 in vertically spaced relation to one another, and each comprising a roller surface (e.g., a semi-cylindrical or other suitable surface), which are opposingly directed toward one another, to define an arcuate space or slot therebetween, and which may simultaneously (e.g., at the same time) cooperate with a lower or first roller 42, in the arcuate space, as will become apparent. The upper guide member 38 and a lower guide member 40 may generally form a rocker configuration comprising a continuous loop, or upper guide member 38 and a lower guide member 40 may terminate in forward and rear stop or stop surfaces (e.g., semi-cylindrical surfaces), engageable with the first roller 42 to stop or limit travel of the first roller 42 with respect to the upper guide member 38 and a lower guide member 40. Stated in another way, the upper guide member 38 and a lower guide member 40 may form a continuous or substantially continuous loop, which may generally define an opening, which may be generally arcuate in shape, for receiving the first roller 42 for travel in the opening.

An upper guide rail 44, which may be generally arcuate in shape (or otherwise have a shape which may correspond to the shape of the tilt seat guide assembly 36) and may be in the shape of an upwardly extending fin. The upper guide rail 44 may extend upwardly from the upper guide member 38, or from an upper surface opposing the roller surface of the upper guide member, and linearly in a longitudinally (i.e., a fore and aft) direction in relation to the upper guide member 38. The upper guide rail 44 cooperates with an upper or second roller 46.

Figure 5:
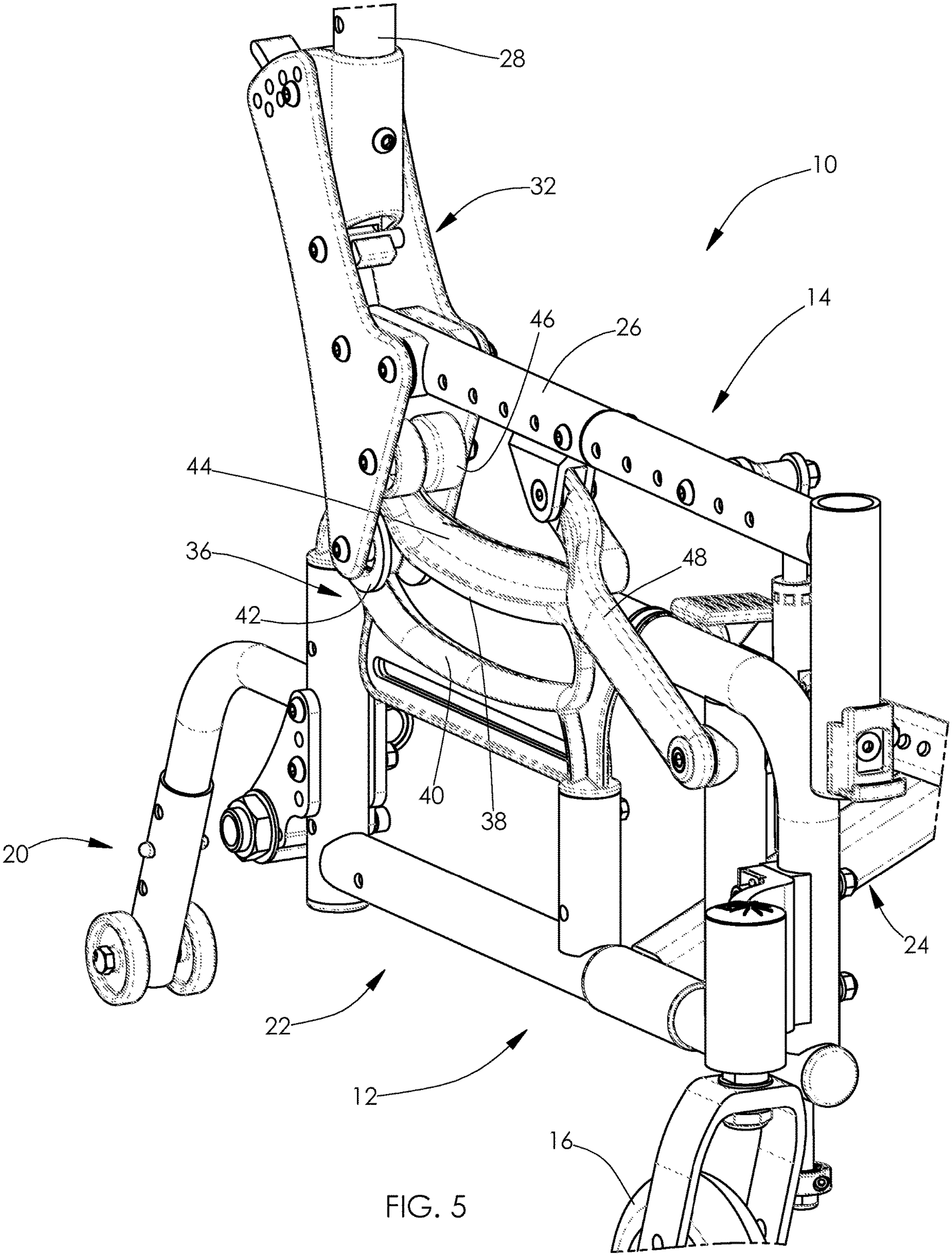
FIG. 5 is an enlarged front perspective view of a portion of the wheelchair showing a tilt seat guide assembly, with the wheelchair in the non-tilted position shown in FIGS. 1 and 2.
Figure 6:
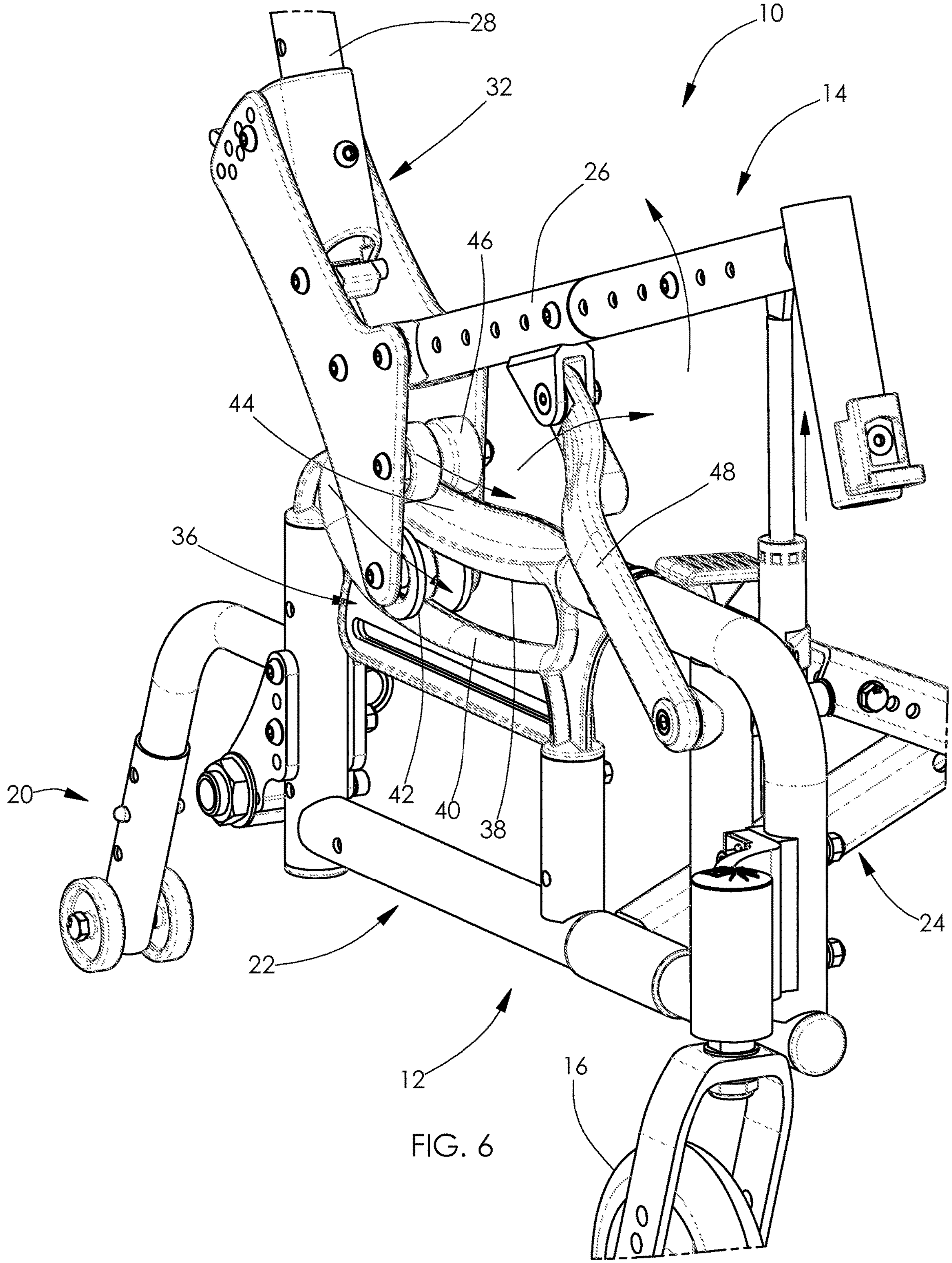
FIG. 6 is an enlarged front perspective view of a portion of the wheelchair showing a tilt seat guide assembly, with the wheelchair in the intermediate tilted position shown in FIG. 3.
Figure 7:
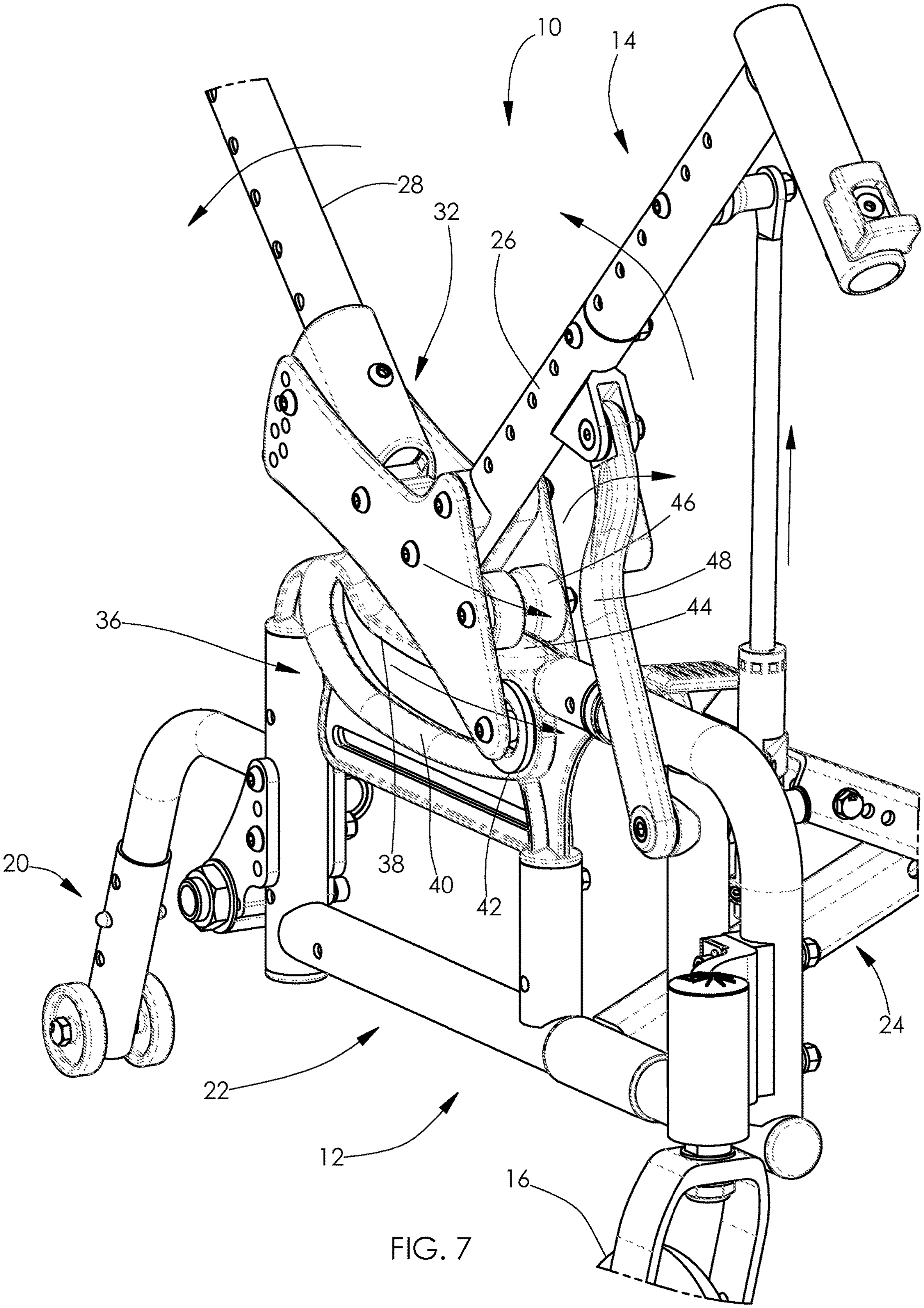
FIG. 7 is an enlarged front perspective view of a portion of the wheelchair showing a tilt seat guide assembly, with the wheelchair in the completely tilted position shown in FIG. 4.
Figure 9:
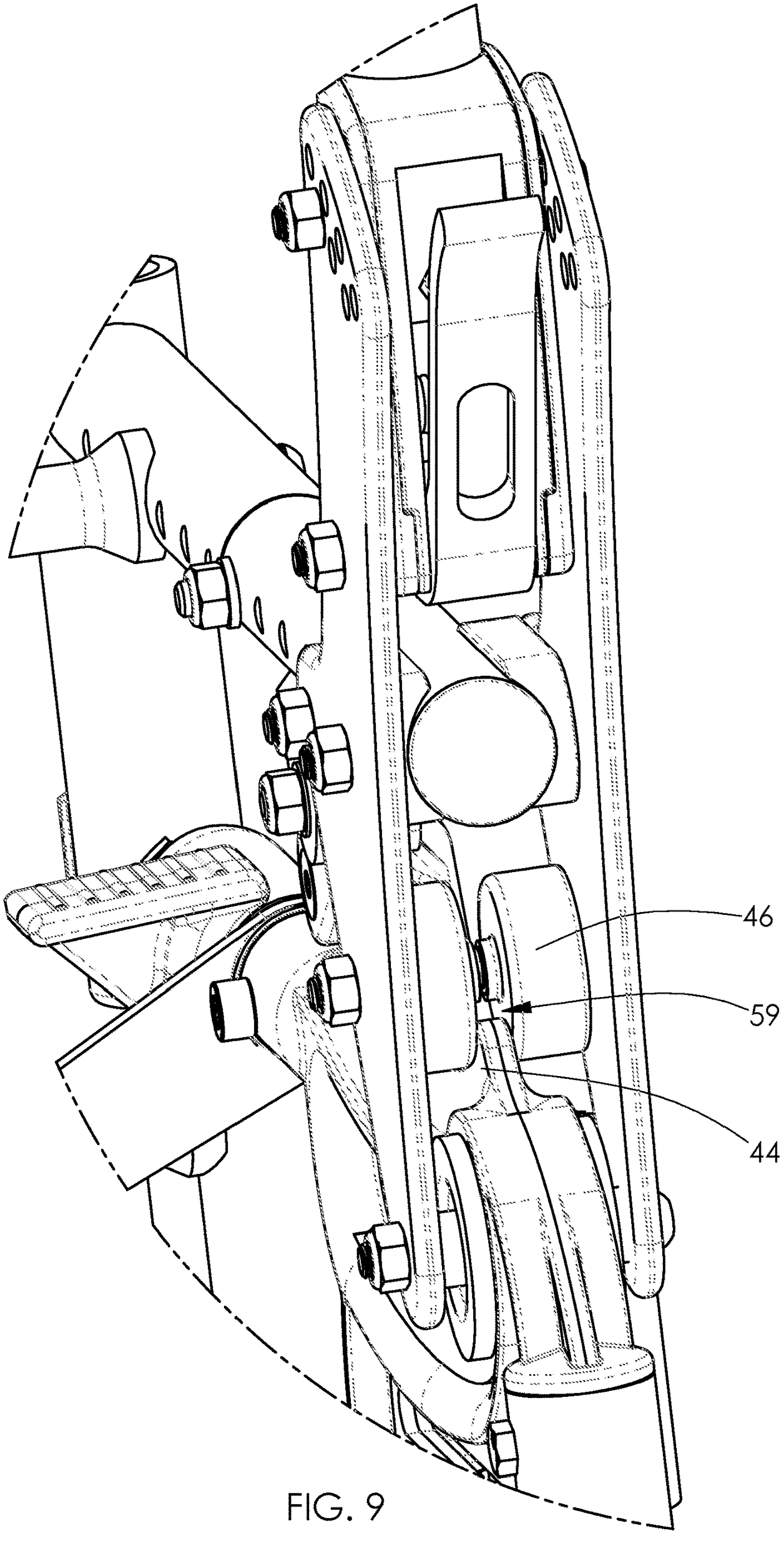
FIG. 9 is a partial front perspective view of the wheelchair showing a gap between an upper roller and a fin on top of a roller guide.

The first and second rollers 42, 46, may form a part of a roller assembly, are supported for rotation in spaced relation (i.e., vertically spaced relation when viewing FIGS. 5-7) to one another by the seat bracket assemblies 32. The first roller 42 may be bifurcated, split or otherwise separable so that the first roller 42 may be assembled into or onto the tilt seat guide assembly 36 between the upper and lower guide members 38, 40, and held in the assemble condition between the laterally spaced brackets of the seat bracket assemblies 32, for example, by a cap screw, the shaft of which may function as an axle or bearing surface to support the first roller 42 for rotational movement. The second roller 46 may be held between the laterally spaced brackets of the seat bracket assemblies 32 in spaced relation to the first roller 42, for example, by a cap screw, the shaft of which may also function as an axle or bearing surface to support the second roller 46 for rotational movement. The first roller 42 and the second roller 46 cooperated to trap the upper guide member 38 and the upper guide rail 44 between the first roller 42 and the second roller 46. The second roller 46 cooperates with the upper guide rail 44 to mitigate, limit or prevent lateral (e.g., side to side) movement of the second roller 46, and the seat bracket assemblies 32, and thus the seat frame 14, or to keep the first roller 42 and the second roller 46 in substantial or general alignment (e.g., upright or vertical alignment when viewing FIGS. 5-7). That is to say, the second roller 42 may be provided to cooperate with an upper guide rail 44 so as to track the movement of the first roller 42 and prevent lateral translation of the seat frame 14 in relation to the base frame 12. This provides lateral stability for the seat frame 14 in relation to the base frame 12, even throughout movement of the first roller 42 and the second roller 46. It is preferable the second roller 46 has limited contact with the upper guide 44, such as along opposingly disposed, laterally spaced surfaces, with a gap 59 between the second roller 46 and the upper guide 44, as shown in FIG. 9

Link arms 48 are pivotally connected between the base frame 12 and seat frame 14. This may be done in any suitable matter. For example, a link arm 48 may have a lower or first end pivotally connected to each side frame 22 and an upper or second end pivotally connected to a corresponding one of the seat tubes 26. In the illustrated embodiment, the lower end of the link arms 48 is connected to the side frames 22 forward of the tilt seat guide assembly 36 and the upper end of the link arm 48 is connected to the seat tubes 26 forward, or toward a forward portion, of the tilt seat guide assembly 36. The lower end of the link arms 48 may be connected to a forward intermediate tubular member of the side frame 22 and the upper end of the link arms 48 may connected to tabs depending or extending downwardly from the seat tubes 26.

It should be noted that the wheelchair 10 (e.g., the seat frame 14 (e.g., the seat and seat back tube 26, 28) may be adjustable, and/or the seat frame 14 may be adjustable in relation to the base 12) so that an occupant may be position such that the center of mass CM of the occupant in the seat frame 14 may be positioned so that the forward stop or stop surface or limit is forward of the center of mass CM and the rear stop or stop surface or limit is rear of the center of mass CM so that the effort of moving the occupant to a tilted position is reduced or mitigated.

It should further be noted that the guide members 38, 40 and the upper guide rail 44 may be shaped to control the path of the rollers 42, 46. For example, the that the guide members 38, 40 and the upper guide rail 44 may be shaped so that an arc of the path of the rollers 42, 46 starts with a steep gradient (e.g., a smaller radius R1) and then becomes more gradual (e.g., a smaller radius R2), as illustrated in FIG. 2.

Figure 3:
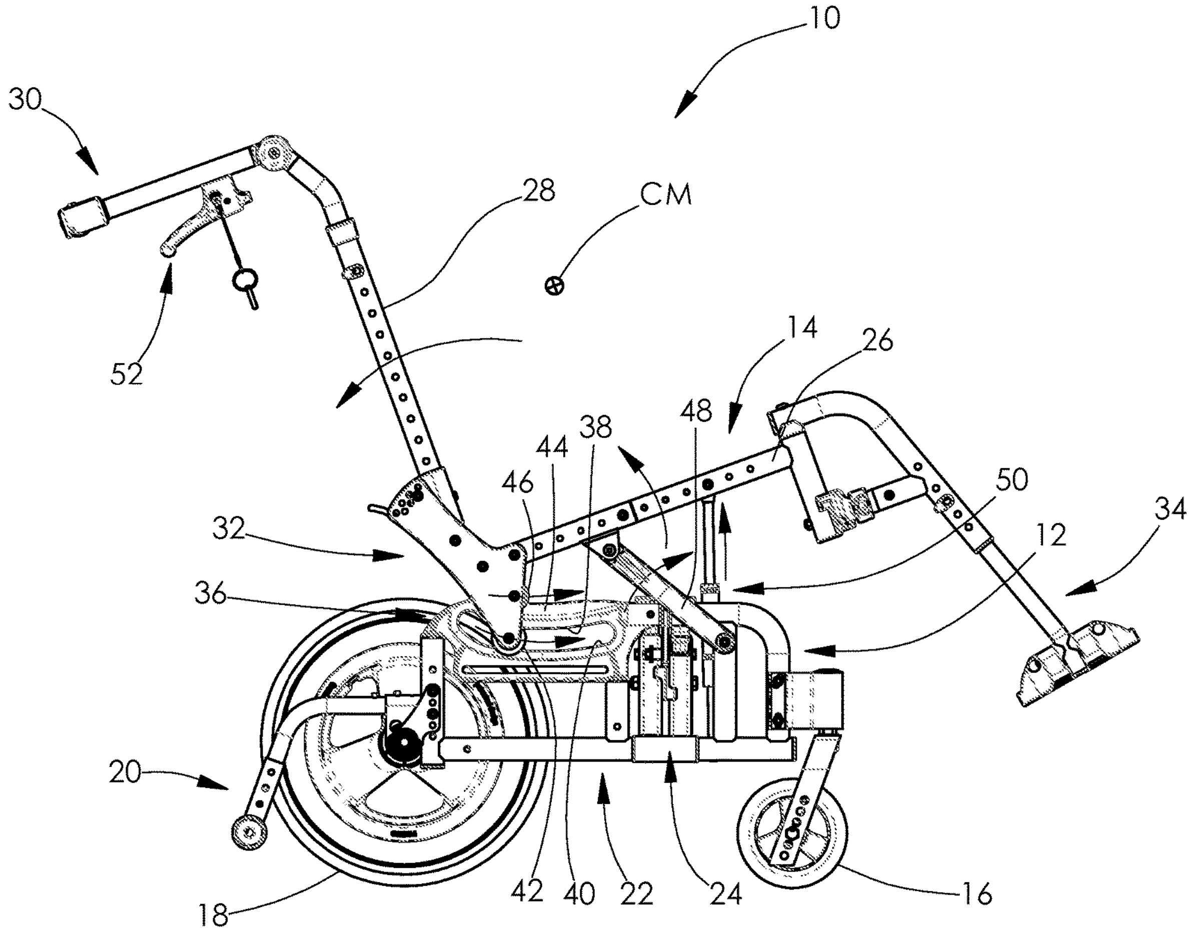
FIG. 3 is a side elevational view of the wheelchair shown in FIG. 1 with the set frame in an intermediate tilted position.
Figure 4:
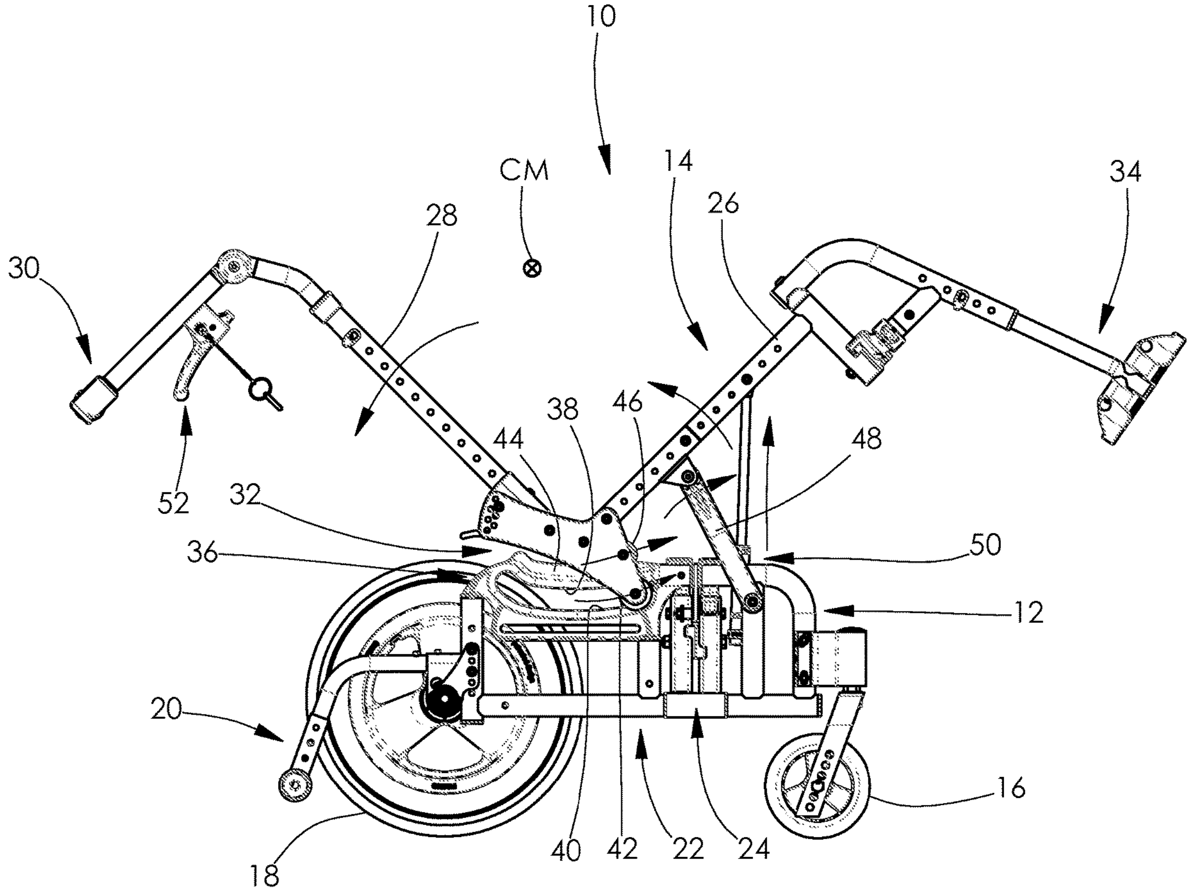
FIG. 4 is a side elevational view of the wheelchair shown in FIG. 1 with the set frame in a completely tilted position.
Figure 8:
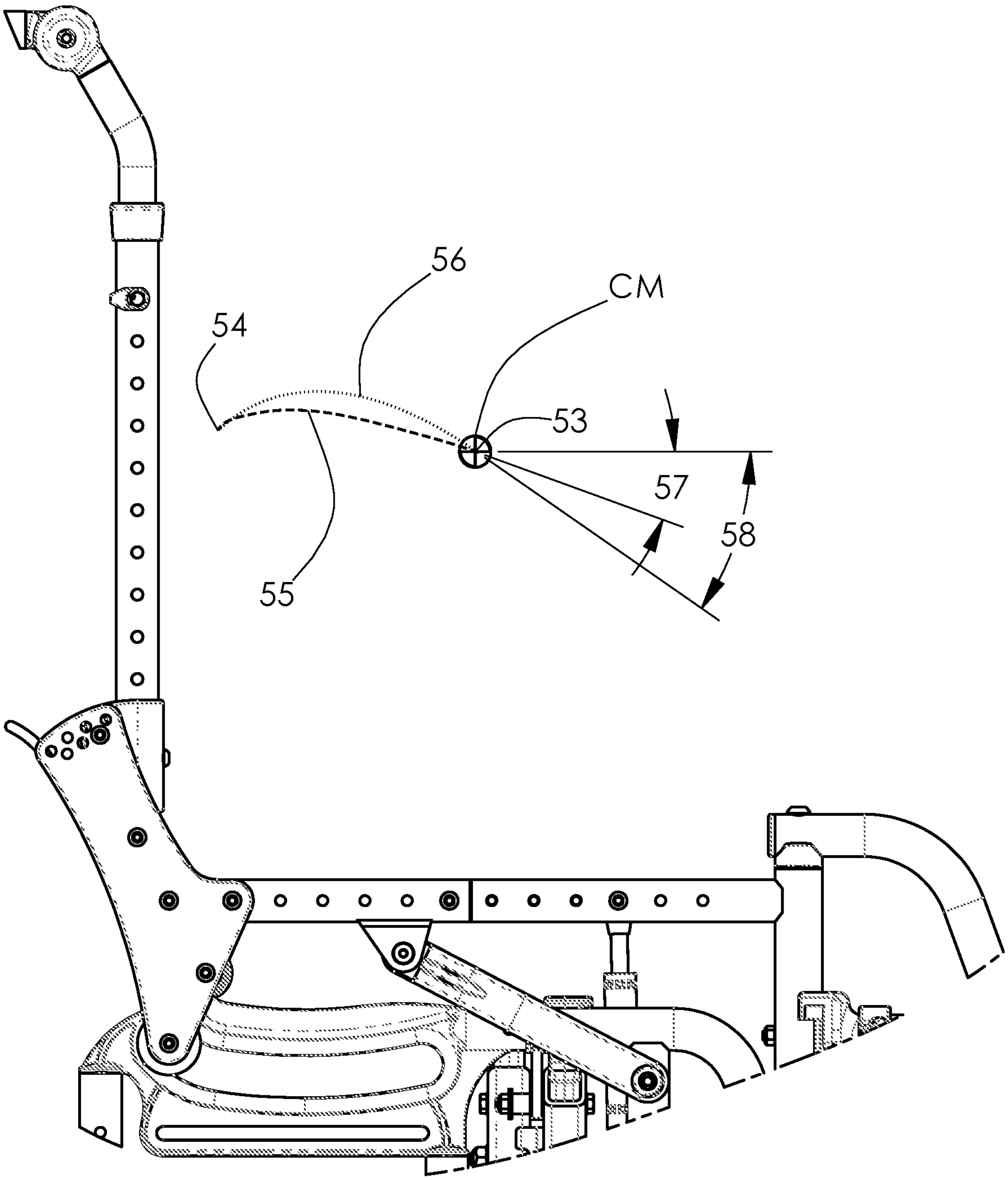
FIG. 8 is a partial side elevational view of the wheelchair showing a path of movement of a center of mass of an occupant in the seat frame movement from the non-tilted position, as shown in FIG. 2, to the tilted position, as shown in FIG. 4.

It should also be appreciated that path of movement of the center of mass CM of the occupant in the seat frame 14 may be maintained a flat as possible. As illustrated in FIG. 8, the center of mass CM is at point 53 in the non-tilted position (e.g., a o degree tilt, as shown in FIG. 2). The center of mass CM moves along a path of travel to point 54 to the tilted position (i.e., a fully tilted position, for example, 45 degrees, as shown in FIG. 4), as represent in FIG. 8 by the dashed line. The center of mass CM moves along the path of travel 55 between the non-tilted and completely tilted position (shown in FIG. 3). A vector 57 tangent to the path of travel 55 is shown in FIG. 8 is in the order of 20 degrees. Compare this with a vector 58 tangent to a path of travel 56 that is in the order of 35 degrees. The path of travel 55 is flatter than the path of travel 56, which is more curved. The flatter path of travel 55 should result in a forty percent reduction in initial tilt force.

Figure 2:
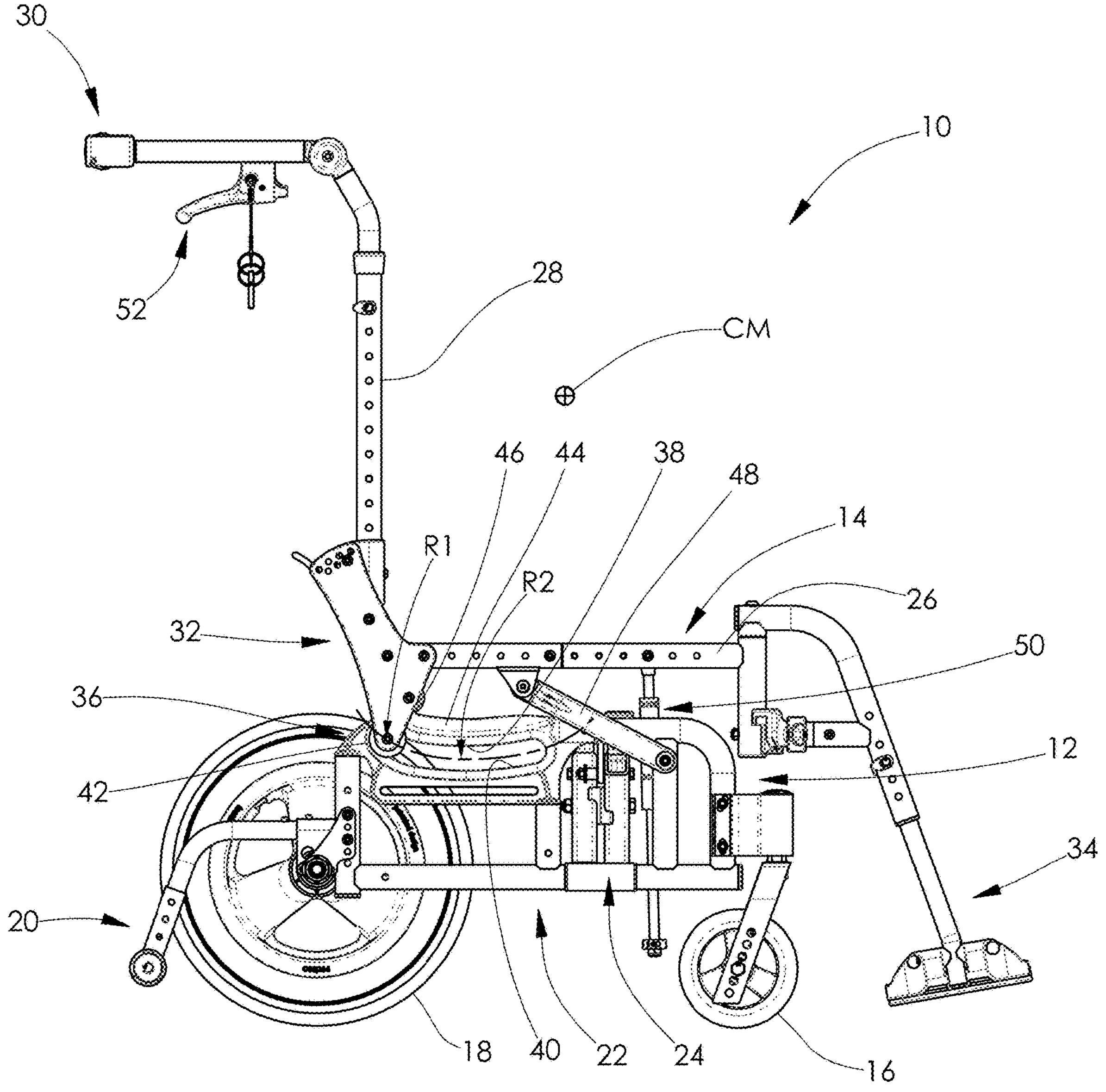
FIG. 2 is an enlarged side elevational view of the wheelchair shown in FIG. 1 with a set frame thereof in a non-tilted position.
Figure 10:
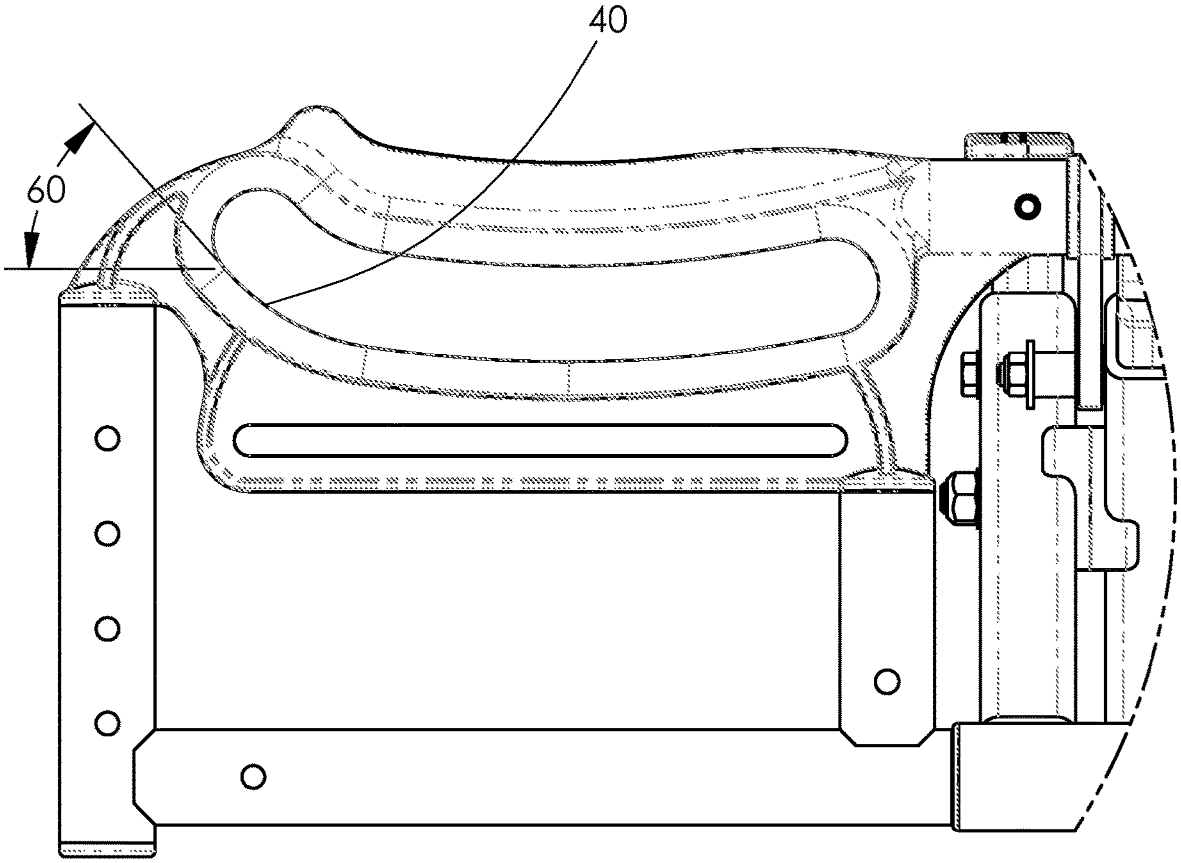
FIG. 10 is a partial side elevational view of the wheelchair showing an exemplary angular drop of the roller guide.

FIG. 10 shows an initial angle of drop 60 along the lower guide member 40 (e.g., from the non-titled position shown in FIG. 2). An increase in the angle of drop 60 allows for a reduced motion vector angle from vector angle 58 to vector angle 57, which will cause an initial tilt force reduction of equivalent magnitude. That is to say, increasing the angle of drop 60 causes a corresponding increase in the motion vector angle from vector angle 58 to vector angle 57 and a corresponding reduction in initial tilt force. For example, by increasing the angle drop, the vector angle 57 can be reduced about 40 percent lower than vector angle 58, which results in an initial force that will be reduced by a proportional amount (i.e., about 40 percent). In the illustrate embodiment, the angle of drop is about 50 degrees (actually 49 degrees), although other angles may be suitable. A minimum angle of drop 60, for example, of 30 degrees, relative to the base frame 12 may be suitable for carrying out the invention. However, for an angle of drop 60 below 30 degrees, the reduction in initial force is minimal. And an angle of drop 60 above 60 degrees may result in adverse mechanical and/or functional effects, such as an increased spongy or sloppy feel or increased roller contact stresses. So, a suitable angle could be in the order of 30 to 60 degrees.

In operation, from an initial, or upright (i.e., non-tilted) position (e.g., shown in FIGS. 1 and 2) an attendant may push downward and rearward on the push handle assembly 30. This, in turn, causes the first roller 42 to move in a forward direction along the upper guide member 38 and the lower guide member 40 of the tilt seat guide assembly 36 and the second roller 46 to move in a forward direction along the upper guide rail 44. As the first roller 42 and the second roller 46 move in a forward direction, the link arm 48 urges the seat frame 14 upward and in a rearward direction to tilt the seat frame 14 in a tilted position (e.g., shown in FIGS. 3 and 4). The degree of tilt may be limited by the limited travel of the first rollers 42 in relation to the tilt seat guide assemblies 36 (as may be limited by the stop or stop surfaces).

It should be appreciated that weight carried by the first roller 42 may bear down on the lower guide member 40 and not make substantial contact with the upper guide member 38 so that little or no contact exists between the first roller 42 and the upper guide member 38, which would produce friction or otherwise encumber travel of the first roller 42.

It should also be appreciated that the link arm 48 may be telescopically or otherwise adjustable in length, or adjustable in relation to the base frame 12 or the seat frame 14, to enable adjustment in an initial angle of the seat frame 14 in relation to the base frame 12 when the seat frame 14 is in the initial, or upright (i.e., non-tilted) position.

The seat frame 14 may be held in a fixed or desired position in any suitable manner. For example, locking members 50 may be provided for holding the seat frame 14 in a desired position. The locking members 50 may be in the form of mech-locks, which may be comprised of a rod in a gas assist cylinder, which may assist an attendant with tilting the seat frame 14 with an occupant in or supported by the wheelchair 10. The locking members 50 are actuatable to enable the rod to move in relation to the cylinder to move the seat frame 14. Actuation may be achieved by a cable connected between the locking member 50 and a trigger handle 42, which may be supported in relation to the push handle assembly 30. Upon squeezing the trigger handle 52, the cable is pulled, which in turn, releases a locking feature of the locking member 50 (e.g., a feature that enables the rod to move in relation to the cylinder), which in turn permits the seat frame 14 to be tilted to a desired position. Once a desired position is achieved, the trigger handle 52 may be released. This in turn engages the locking feature of the locking member 50 prohibit movement of the seat frame 14, thus holding the seat frame 14 in the desired position.

By providing an arcuate path that helps start the tilt by moving downward in the beginning when the center of mass CM is forward of the roller 42 and then upward at the end when the center of mass CM is rearward of the roller 42, the effort of moving the mass is mitigated. The tiltable feature also allows for a more laterally rigid relationship so that a simple X-style cross-frame assembly can used to fold the wheelchair 10. Other chairs need an additional folding cross-member on the seat frame, which adds weight and makes folding more difficult. Compare the instant invention with a tiltable feature with a single pivot, which results in substantial movement of the center of mass CM throughout tilt of the seat frame 14. The tilt seat guide assembly 36 according to the invention has a variable pitch of curvature with an initial slope to aid in tilting the seat frame 14 from the non-tilted position. Vertical movement of the center of mass CM is also preferably limited, as horizontal as possible, within operating constraints and in accordance with demands and loads on the seat frame 14. Further, it should be appreciated that the first roller 42 preferably has limited contact with the upper guide member 38 so as to not interfere or encumber movement of the roller 42, which rests on and travels along the lower guide member 40. This interaction mitigates or prevents lift and/or rattling of the tilt seat guide assembly 36. Also, as stated about the roller 46 has limited contact with the upper guide rail 44 so as to not interfere or encumber movement of the assembly 36. Due to the configuration of the tilt seat guide assembly 36, initial movement of the link arm 48 may be limited. As mentioned above, the geometry of the tilt seat guide assembly 36, where the path of travel from a non-tilted position starts with a steep gradient and then becomes more gradual, with a smaller radius at the beginning of the path of travel and a larger radius along the path of travel, results in the demand for less force to tilt the seat frame 14 from the non-tilted position.

It should be noted that orientational terms used throughout this description are with reference to the orientation of the invention and component parts thereof as presented in the accompanying drawings, which is subject to change. Therefore, orientational terms are used for semantic purposes, and do not limit the invention or its component parts in any particular way.

While the invention and components parts thereof may have been described herein in terms of certain components being referred to in either the singular or the plural, other arrangements are possible. For example, it is to be understood that due to the conceptual description presented herein, components presented in the singular may be provided in the plural, and vice versa.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

PARTS LIST

10 wheelchair
12 base frame
14 seat frame
16 front caster wheels
18 rear wheels
20 anti-tip wheel assemblies
22 side frames
24 cross-frame assembly
26 seat tubes
28 seat back tubes
30 push handle assembly
32 seat bracket assemblies
34 footrest assemblies
36 tilt seat guide assembly
38 upper guide member
40 lower guide member
42 lower or first roller
44 upper guide rail
46 upper or second roller
48 link arm
50 locking member
52 trigger handle
53 center of mass at non-titled position
54 center of mass at titled position
55 more horizontal path of travel
56 more curved path of travel
57 vector of more horizontal path of travel
58 vector of more curved path of travel
59 gap
60 angle of drop

What is claimed is:

1. A tiltable wheelchair comprising:

a base frame, a seat frame, a tilt seat guide assembly, and a first roller supported for movement in relation to the frame tilt seat guide assembly for supporting the seat frame in relation to the base frame, wherein the first roller is moveable along the tilt seat guide assembly in fore and aft directions to enable tilt of the seat frame in relation to the base frame, wherein the first roller moves along a path of travel in relation to the tilt guide assembly when moving the seat frame in relation to the base frame between the non-tilted and tilted positions, wherein the path of travel has an initial gradient that is steeper with a smaller radius during initial movement of the seat frame the non-tilted position and then becomes more gradual with a larger radius along the path of travel as the seat frame continues of be tilted, which results in a demand for less force to tilt the seat frame from the non-tilted position, and a cross-frame assembly, wherein the base frame comprises laterally spaced side frames, the cross-frame assembly being connected between the side frames the cross-frame assembly being moveably connected to the side frames so as to be foldable to enable the side frame to move toward one another to fold the wheelchair.

2. A tiltable wheelchair comprising:

a base frame, a seat frame, a tilt seat guide assembly, a first roller supported for movement in relation to the frame tilt seat guide assembly for supporting the seat frame in relation to the base frame, and wherein the first roller is movable along the tilt seat guide assembly in fore and aft directions to enable tilt of the seat frame in relation to the base frame, and wherein the tilt seat guide assembly comprises an upper guide member and a lower guide member in vertically spaced relation to one another, and each comprising a roller surface, which are opposingly directed toward one another, and which define an arcuate space therebetween, and which cooperate with the first roller throughout movement of the first roller within the arcuate space, and wherein the lower guide member has a variable pitch arcuate path with an initial slope that is steeper with a first radius during initial movement of the seat frame from a non-tilted position and then becomes more gradual with a second radius, which is larger than the first radius, along a path of travel as the seat frame continues of be tilted, which results in a demand for less force to tilt the seat frame from the non-tilted position.

3. The tiltable wheelchair of claim 2, wherein the tilt seat guide assembly is supported in relation to the base frame and the first roller is supported in relation to the seat frame support.

4. The tiltable wheelchair of claim 2, further comprising a link arm connected between the base frame and seat frame operable to urge the seat frame upward and rearward to tilt the seat frame in relation to the base frame as the first roller moves in a forward direction.

5. The tiltable wheelchair of claim 2, further comprising:

a guide rail supported in relation to the tilt seat guide assembly, and a second roller cooperating with a guide rail so as to track the movement of the first roller and prevent lateral translation of the seat frame in relation to the base frame.

6. The tiltable wheelchair of claim 5, wherein guide rail is in the shape of an upwardly extending, arcuate shaped fin, which extends along a path corresponding to the variable pitch arcuate of the lower guide member, and the second roller cooperating with opposing surfaces of the fin so as to track the movement of the first roller and prevent lateral translation of the seat frame in relation to the base frame.

7. The tiltable wheelchair of claim 2, further comprising a locking device operable to hold the seat frame in a desired position.

8. The tiltable wheelchair of claim 2, further comprising a cross-frame assembly, wherein the base frame comprises laterally spaced side frames, the cross-frame assembly being connected between the side frames the cross-frame assembly being moveably connected to the side frames so as to be foldable to enable the side frame to move toward one another to fold the wheelchair.

9. The tiltable wheelchair of claim 2, wherein the wheelchair seat frame is configured so that an occupant of the wheelchair is positionable such that a center of mass of the occupant supported by the wheelchair is positionable between forward and rear end tilt limits of the tilt seat guide assembly.

10. The tiltable wheelchair of claim 2, wherein the initial gradient of the path of travel of the movement of the first roller defines an angle of drop, which is in the order of 30 to 60 degrees.

* * * * *